(12) United States Patent
Moon et al.

(10) Patent No.: US 12,339,874 B2
(45) Date of Patent: Jun. 24, 2025

(54) DENSITY-BASED DATA CLUSTERING APPARATUS AND METHOD

(71) Applicant: SEOUL NATIONAL UNIVERSITY R&DB FOUNDATION, Seoul (KR)

(72) Inventors: Bongki Moon, Seoul (KR); Kyoseung Koo, Seoul (KR); Bogyeong Kim, Seoul (KR); Undraa Enkhbat, Seoul (KR)

(73) Assignee: Seoul National University R&DB Foundation, Seoul (KR)

( * ) Notice: Subject to any disclaimer, the term of this patent is extended or adjusted under 35 U.S.C. 154(b) by 0 days.

(21) Appl. No.: 18/206,784

(22) Filed: Jun. 7, 2023

(65) Prior Publication Data

US 2024/0330324 A1     Oct. 3, 2024

(30) Foreign Application Priority Data

Mar. 29, 2023   (KR) .......................... 10-2023-0041147

(51) Int. Cl.
*G06F 16/28*          (2019.01)
(52) U.S. Cl.
CPC ................. *G06F 16/285* (2019.01)
(58) Field of Classification Search
CPC .... G06F 16/215; G06F 16/22; G06F 16/2246; G06F 16/245; G06F 16/24568; G06F 16/2465; G06F 16/2477; G06F 16/285; G06F 16/35; G06F 16/355; G06F 16/55;
(Continued)

(56) References Cited

U.S. PATENT DOCUMENTS

| | | | | |
|---|---|---|---|---|
| 6,195,659 B1 * | 2/2001 | Hyatt | ...................... | G06F 18/23 |
| | | | | 382/128 |
| 7,289,985 B2 * | 10/2007 | Zeng | ..................... | G06F 16/957 |
| | | | | 707/E17.084 |
| 9,645,999 B1 * | 5/2017 | Ciulla | ..................... | G06F 16/35 |

(Continued)

FOREIGN PATENT DOCUMENTS

KR     10-2021-0118067 A      9/2021

OTHER PUBLICATIONS

H. Wang et al, "Progress in Outlier Detection Techniques: A Survey," 2019, IEEE Access, vol. 7, pp. 107964-108000 (Year: 2019).*

(Continued)

*Primary Examiner* — Robert W Beausoliel, Jr.
*Assistant Examiner* — Cheryl M Shechtman
(74) *Attorney, Agent, or Firm* — NSIP Law

(57) ABSTRACT

A density-based data clustering apparatus includes a memory storing a data clustering program, and a processor configured to execute the data clustering program, wherein the data clustering program stores input data, which is added to a sliding window for processing streaming data, together with spatial information and temporal information, removes deviation data deviating from the sliding window, classifies the input data into a core, a border, or noise according to density based on the spatial information and the temporal information, updates a cluster based on a result of classification of the input data and a result of removal of the deviation data, forms the cluster including one or more cores and borders, and updates the cluster through a spanning tree connecting cores within a critical distance by an edge.

15 Claims, 11 Drawing Sheets

(58) Field of Classification Search
CPC .... G06F 18/23; G06F 18/24; G06F 18/24137; G06F 16/50
See application file for complete search history.

(56) References Cited

U.S. PATENT DOCUMENTS

| | | | |
|---|---|---|---|
| 2015/0261886 A1* | 9/2015 | Wu | G06F 16/9024 707/798 |
| 2018/0268049 A1* | 9/2018 | Youssefian | H04L 67/52 |
| 2019/0042618 A1* | 2/2019 | Potulska | G06N 5/01 |
| 2020/0225673 A1* | 7/2020 | Ebrahimi Afrouzi | A47L 11/4011 |
| 2021/0019558 A1* | 1/2021 | Edge | G06F 18/2323 |
| 2022/0037033 A1* | 2/2022 | Srinivasan | G06F 16/29 |
| 2022/0044244 A1* | 2/2022 | Chen | G06Q 20/405 |
| 2022/0066533 A1* | 3/2022 | Endoh | G06F 18/23211 |
| 2023/0067842 A1* | 3/2023 | Yin | H04L 43/04 |

OTHER PUBLICATIONS

Kim et al. "DenForest: Enabling Fast Deletion in Incremental Density-Based Clustering over Sliding Windows" Proceedings of the 2022 International Conference on Management of Data, Jun. 12-17, 2022 (pp. 296-309).

* cited by examiner

THRESHOLD NUMBER=4

| POINT ID | INPUT TIME POINT |
|---|---|
| 1 | 0seconds |
| 2 | 1seconds |
| 3 | 2seconds |
| 4 | 2seconds |
| 5 | 3seconds |
| 6 | 4seconds |
| 7 | 5seconds |
| 8 | 5seconds |
| 9 | 6seconds |
| 10 | 7seconds |
| 11 | 8seconds |
| 12 | 8seconds |

THRESHOLD NUMBER=4

| POINT ID | INPUT TIME POINT |
|---|---|
| 1 | 0seconds |
| 2 | 1seconds |
| 3 | 2seconds |
| 4 | 2seconds |
| 5 | 3seconds |
| 6 | 4seconds |
| 7 | 5seconds |
| 8 | 5seconds |
| 9 | 6seconds |
| 10 | 7seconds |
| 11 | 8seconds |
| 12 | 8seconds |

DENSITY-BASED DATA CLUSTERING APPARATUS AND METHOD

CROSS-REFERENCE TO RELATED APPLICATION

This application claims the benefit under 35 USC 119(a) of Korean Patent Application No. 10-2023-0041147, filed on Mar. 29, 2023, in the Korean Intellectual Property Office, the entire contents of which are incorporated herein by reference.

BACKGROUND

The present disclosure relates to density-based data clustering apparatus and method.

Clustering is an analysis method for grouping data with similar characteristics in given data. For example, clustering is frequently used in various application fields, such as traffic jam analysis, hotspot analysis, and social network analysis. Clustering algorithms are classified into center-based clustering, hierarchical clustering, and density-based clustering depending on methods of finding clusters. The density-based clustering is a method of finding clusters by considering density of data. Data areas classified at high density form one group, and the group and surrounding data are gathered to form one cluster.

The density-based clustering is also used in a streaming environment in which insertion and removal of data are made based on a specific cycle. To use the method in a streaming environment, incremental density-based clustering algorithms for incrementally inserting and removing data are used. The density-based clustering algorithms often manage data clustering internally using a graph data structure. In this case, the graph data structure may be managed physically or only conceptually. In addition, vertices of a graph represent each data, and edges are connected to each other when a distance between the vertices is short. However, algorithms based on the graph data structure have a limitation that removal of data is slow.

When data is removed within a cluster, one cluster may be divided into several parts. In order to determine this, it is necessary to check whether the graph is divided into several parts when a vertex corresponding to the removed data is removed from the internally managed graph. However, the only way to check this is to use an expensive operation called graph traversal to see whether the clusters are connected to each other. As such, conventional incremental density-based clustering algorithms have to check whether a graph is internally separated whenever data is removed. Therefore, there is a problem in that data removal becomes slow. This results in the fact that the density-based clustering algorithms may not be utilized in real-time in various application fields, or the possibility of real-time utilization is greatly limited.

The present disclosure proposes a new density-based clustering algorithm to solve the problem of slowing down data removal.

The related art includes Korean Patent Publication No. 2021-0118067 (Title of Invention: Clustering Apparatus and Clustering Method)

SUMMARY

The present disclosure provides a density-based clustering apparatus and a density-based clustering method that may solve a speed delay problem when removing data.

However, the technical problems to be solved by the present disclosure are not limited to the technical problem described above, and there may be another technical problem.

According to an aspect of the present disclosure, a density-based data clustering apparatus includes a memory storing a data clustering program, and a processor configured to execute the data clustering program, wherein the data clustering program stores input data, which is added to a sliding window for processing streaming data, together with spatial information and temporal information, removes deviation data deviating from the sliding window, classifies the input data into a core, a border, or noise according to density based on the spatial information and the temporal information, updates a cluster based on a result of classification of the input data and a result of removal of the deviation data, forms the cluster including one or more cores and borders, and updates the cluster through a spanning tree connecting cores within a critical distance by an edge, a weight value of the edge is set to a value that expires earlier among core expiration time points of both cores, and the border is outside the spanning tree.

According to another aspect of the present disclosure, a density-based data clustering method performed by a density-based data clustering apparatus includes storing input data, which is added to a sliding window for processing streaming data, together with spatial information and temporal information, removing deviation data deviating from the sliding window, classifying the input data into a core, a border, or noise according to density based on the spatial information and the temporal information, and updating a cluster based on a result of classification of the input data and a result of removal of the deviation data, wherein, in the updating of the cluster, the cluster including one or more cores and borders is formed, the cluster is updated through a spanning tree connecting cores within a critical distance by an edge, a weight value of the edge is set to a value that expires earlier among core expiration time points of both cores, and the border is outside the spanning tree.

According to the above-described problem solving means of the present application, spatial information and temporal information may be stored together, data points may be classified based thereon, the data points may be classified by using only data that is input before or at the same time as the input data, and accordingly, an expiration time point of the corresponding core may be immediately checked at the time point at which the data points are classified as the core. Characteristics of the core are different from characteristics of the known technology, and the core may be referred to as a nostalgic core. A spanning tree is used as a tree structure for managing the core. By using a spanning tree instead of graph traversal to manage the core of the present disclosure, a separation of the tree due to the removal of data points can be directly reflected in a graph. Accordingly, an effect of reducing the time required for a graph traversal is obtained.

That is, determination of separation of a cluster may performed with a simple procedure of checking whether spanning tree is separated, thereby being quickly performed. On the other hand, a separation of a graph is not determined immediately since a graph traversal is required to check whether the graph has another path connecting vertices.

Also, unlike the known methods, spatial search queries are not performed when removing data points, and thus, the required time is less affected by the dimensionality of data.

BRIEF DESCRIPTION OF THE DRAWINGS

Embodiments will be more clearly understood from the following detailed description taken in conjunction with the accompanying drawings in which:

FIGS. 8A to 10D are diagrams for explaining a cluster update process according to an embodiment of the present disclosure. FIGS. 8A, 8B, 8C and 8D illustrate a process of inserting a new core into a cluster.

FIGS. 10A, 10B, 10C, and 10D illustrate a process in which a core is removed and a process in which clusters are separated from each other.

DETAILED DESCRIPTION OF THE EMBODIMENTS

Figure 1:
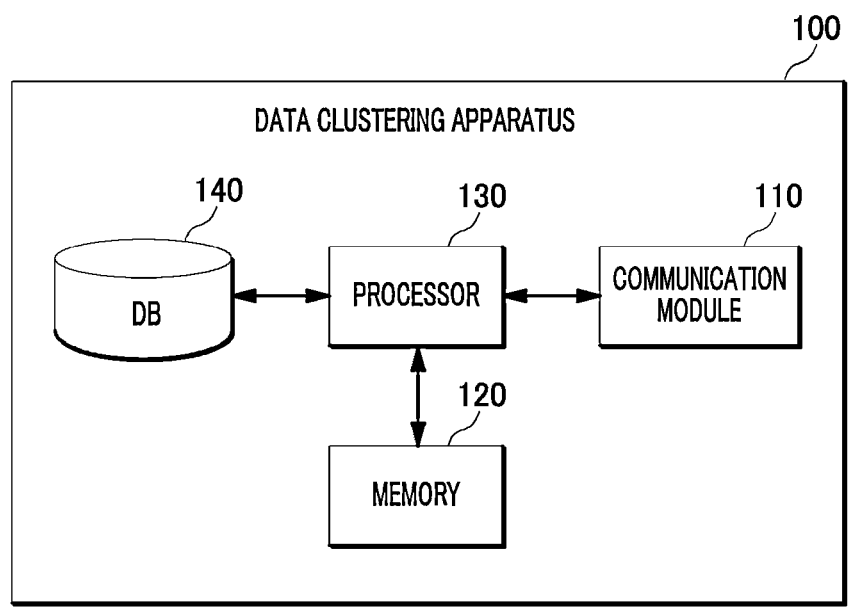
FIG. 1 is a block diagram illustrating a configuration of a data clustering apparatus according to an embodiment of the present disclosure.

Hereinafter, embodiments of the present disclosure will be described in detail such that those skilled in the art to which the present disclosure belongs may easily implement the present disclosure with reference to the accompanying drawings. However, the present disclosure may be implemented in many different forms and is not limited to the embodiments to be described herein. In addition, in order to clearly describe the present disclosure with reference to the drawings, portions irrelevant to the description are omitted, and similar reference numerals are attached to similar portions throughout the specification.

Throughout the present specification, when a portion is described to be "connected" to another portion, this includes not only a case where the portion is "directly connected" thereto, but also a case where the portion is "electrically connected" thereto with another element therebetween.

Throughout the present specification, when a member is described to be "on" another member, this includes not only a case where the member is in contact with another member, but also a case where another member exists between the two members.

Hereinafter, embodiments of the present disclosure will be described in detail with reference to the accompanying drawings.

FIG. 1 is a block diagram illustrating a configuration of a data clustering apparatus according to an embodiment of the present disclosure.

A data clustering apparatus 100 includes a communication module 110, a memory 120, a processor 130, and a database (DB) 140.

The data clustering apparatus 100 clusters streaming data that is input in real time according to a preset condition or updates the formed cluster. The data clustering apparatus 100 may be implemented by a computer or portable terminal capable of accessing a network. Here, the computer may include, for example, a notebook computer, a desktop computer, a laptop computer, and the like, and the portable terminal is, for example, a wireless communication device that ensures portability and mobility and may include all kinds of handheld-based wireless communication devices, such as a smartphone, a tablet personal computer (PC), and a smart watch.

Also, the data clustering apparatus 100 may function as a server that provides a data clustering result to an external computing device. In this case, the server may operate in a cloud computing service model, such as software as a service (Saas), platform as a service (PaaS), or infrastructure as a service (IaaS), and may be built in a form, such as a private cloud, a public cloud, or a hybrid cloud.

The communication module 110 receives various streaming data from an external computing device. In this case, vehicle location data, various image data, product purchase transaction data, user preference data, and embedding data may be used as the streaming data. The communication module 110 may include hardware and software required to transmit and receive signals, such as a control signal and a data signal, to and from another network device through a wired or wireless connection.

A data clustering program is stored in the memory 120. The data clustering program may be executed by the processor 130, store the input data added to a sliding window for processing streaming data along with spatial and temporal information, and remove deviation data deviating from the sliding window, classify input data into core, border, and noise according to density based on the spatial and temporal information, and update clusters based on a classification result and a removal result. The detailed configuration of the data clustering program will be described below.

Meanwhile, the memory 120 should be interpreted as collectively referring to a non-volatile storage device that continuously maintains the stored information even when power is not supplied and a volatile storage device that requires power to maintain the stored information. The memory 120 may include magnetic storage media or flash storage media in addition to the volatile storage device that requires power to maintain the stored information, but the scope of the present disclosure is not limited thereto.

The processor 130 may control a general computing operation of the data clustering apparatus 100, for example, an operation of executing an operating system or an operation of managing data received from an external device through the communication module 110. In addition, the processor 130 starts executing the data clustering program stored in the memory 120 according to a manager's execution request and transmits the execution result of the program to an external device through the communication module 110.

The processor 130 may include any type of device capable of processing data. For example, the processor 130 may refer to a data processing device that has a physically structured circuit to perform a function expressed as a code or command included in a program and is embedded in hardware. The data processing device embedded in hardware may include, for example, a microprocessor, a central processing unit (CPU), a processor core, a multiprocessor, an application-specific integrated circuit (ASIC), a field programmable gate array (FPGA), and so on, but the scope of the present disclosure is not limited thereto.

The database 140 may store or provide data required for the data clustering apparatus 100 under control by the processor 130. For example, the database 140 may store input data or store an index for the input data. In addition, the database 140 may manage a connection history of the data clustering apparatus 100 and a data transmission history of the data clustering apparatus 100. The database 140 may be included as a component separate from the memory 120 or may be built in a partial area of the memory 120.

Figure 2:
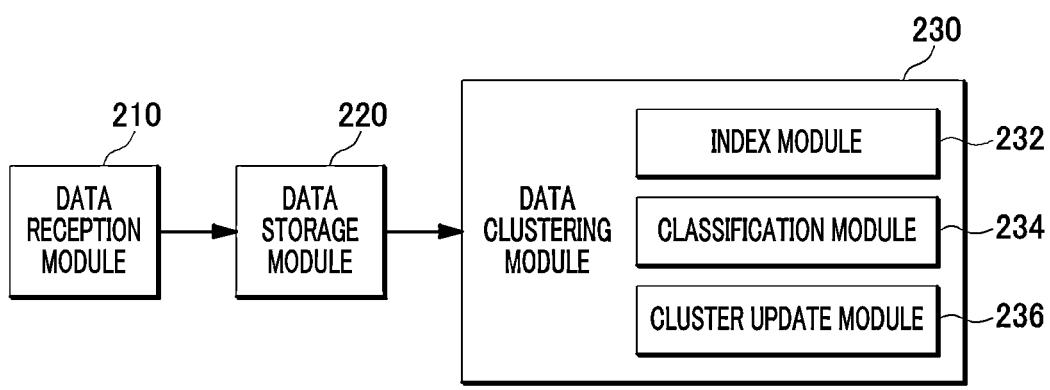
FIG. 2 is a block diagram illustrating a configuration of a data clustering program according to an embodiment of the present disclosure.

FIG. 2 is a block diagram illustrating a configuration of a data clustering program according to an embodiment of the present disclosure.

The data clustering program includes a data reception module 210, a data storage module 220, and a data clustering module 230. Also, the data clustering module 230 includes an index module 232, a classification module 234, and a cluster update module 236.

The data reception module 210 receives various types of data through a storage device or the communication module 110 connected to the data clustering apparatus 100, and transmits the data to the data storage module 220. In this case, the various types of data may be streaming data.

The data storage module 220 may receive data from the data reception module 210 and store the data in the memory 120 or the database 140 in a sequence of time. The data storage module 220 may use a sliding window during a process of storing data. The data storage module 220 stores spatial information representing a position of each input data and temporal information representing a time when each input data is input in relation to the input data added to the sliding window. Hereinafter, the sliding window will be described in detail.

Figure 3:
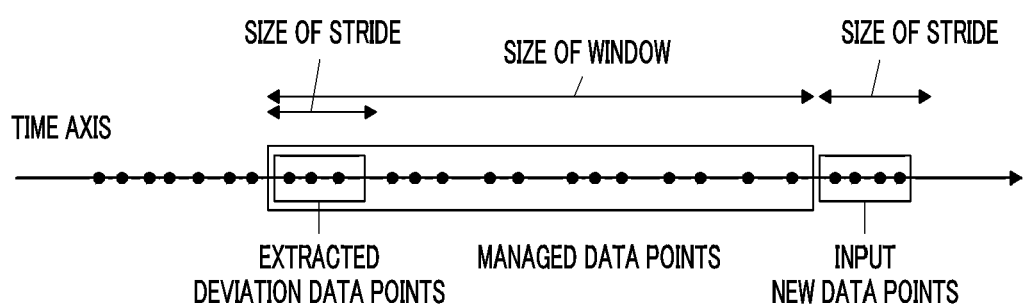
FIG. 3 is a diagram illustrating a sliding window used in a data clustering process according to an embodiment of the present disclosure.

FIG. 3 is a diagram illustrating a sliding window used in a data clustering process according to an embodiment of the present disclosure.

It is difficult to store the whole streamed data due to the property of continuously generating data. In such a streaming environment, the sliding window is used to capture the latest state of data. The sliding window may be represented by two parameters of window and stride. The window is a set of recent data points. A size of the window may be defined as the number of data points (count-based window) or time interval (time-based window). The stride is defined as a period at which the window is updated. A size of the stride is determined by the number of data points or the time interval depending on the type of the sliding window. In addition, data points within the same stride are input to or removed from the window together.

For example, assuming that the sliding window is a time-based window and the size of the stride is set to 30 seconds (the size of the window is a time interval longer than 30 seconds), the window is updated every 30 seconds, and a new data point group of 30 second period is added to the window every update. Also, every 30 seconds, the oldest data point group of 30 second period deviates from the window, and the deviation data is removed from a cluster.

The data storage module 220 manages data corresponding to a size of the window, and transmits data points corresponding to a size of the stride to the data clustering module 230 over time and requests insertion of the data points into the cluster, or transmits the data points deviated from the window to the data clustering module 230 and requests removal of the data points from the cluster.

Referring back to FIG. 2, the data clustering module 230 includes the index module 232, the classification module 234, and the cluster update module 236. When a data insertion request is received through the data storage module 220, the data clustering module 230 indexes the input data through the data index module 232, classifies the data through the classification module 234, and updates a cluster by reflecting a classification result of the data through the cluster update module 236. In addition, when a data removal request is received through the data storage module 220, the data clustering module 230 removes corresponding data through the data index module 232 and updates the cluster by reflecting a removal result of the data through the cluster update module 236.

The data clustering module 230 indexes the stored input data through the index module 232. The index module 232 indexes and stores spatial information of the input data. The index module 232 stores data by using a spatial index to facilitate spatial search of the input data. For example, an R-tree index may be used, and another spatial index may also be used. By using the spatial index, data points within a certain radius to be found among stored data points may be easily searched.

In addition, the index module 232 searches for and returns data satisfying a preset condition from the index according to a request of the data clustering module 230. For example, the index module 232 searches for data within a critical distance from a given data point and returns the searched data to the data clustering module 230. Also, the index module 232 may perform an operation of removing spatial information of the data to be deleted.

The classification module 234 classifies input data into core, border, and noise according to density based on spatial and temporal information. A detailed classification process will be described with reference to drawings.

Figures 4A, 4B:
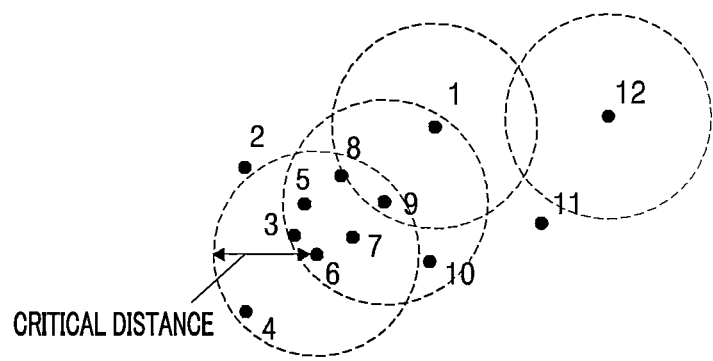
FIGS. 4A and 4B are a diagram illustrating a data classification method in a data clustering method according to an embodiment of the present disclosure.

FIGS. 4A and 4B are a diagram illustrating a data classification method in a data clustering method according to an embodiment of the present disclosure.

As illustrated in FIGS. 4A and 4B, each data is sequentially input, and information on an identification number and an input time for each data point may be managed in a table form.

For a given input data point, consider data points input at the same time as the input data point or earlier and also spatially located within a critical distance of the input data point. When the number of the data points is greater than or equal to a threshold number, the input data point is classified as a core. On the other hand, when the number of the data points is less than the threshold number, the input data point is classified as a non-core. In particular, when there is another core in the data points, the input data point is classified as a border, and otherwise, the input data point is classified as noise.

In FIGS. 4A and 4B, it is assumed that a size of the window is greater than 10 seconds and a size of the stride is 1 second. Four data points (data points 3, 4, 5, and 6), among data points input before and at the time (4 seconds) when the data point 6 is input, are within the critical distance, and the number of four data points is greater than or equal to a threshold number (4), and thus, the data point 6 is classified as a core. Similarly, when a data point 9 is input, seven data points (data points 1, 3, 5, 6, 7, 8, and 9), among data points input before and at the time (6 seconds) when the data point 9 is input, are within the critical distance, and the number of seven data points is greater than or equal to the threshold number (4), and thus, the data point 9 is classified as a core.

Unlike this, when a data point 1 is input, there is no data point greater than or equal to the threshold number (4) within the critical distance, and the data point 9 classified as the core exist within the critical distance, and thus, the data point 1 is classified as a border. Also, when a data point 12 is input, there is no data point within the critical distance, and thus, the data point 12 is classified as the noise.

In addition, as time passes, new data is input to the sliding window, and data points are removed while the existing data deviates, and accordingly, data points classified as the core may not satisfy a core condition. In this way, a time when the input data classified as the core does not satisfy the core condition is defined as a core expiration time. In the present disclosure, spatial information and temporal information of each data point are managed together, and thus, it is possible to calculate in advance whether the corresponding input data is released from the core when the input data is classified as the core. Since characteristics of the core are different from characteristics of the known core, the core of the present disclosure may also be referred to as a nostalgic core in order to emphasize the characteristics. This is intended to express such a functional feature because, unlike other clustering algorithms, both spatial information and temporal information for each data point may be managed together, and the core may be classified by considering only past temporal information.

A method of calculating a core expiration time is as follows.

Figure 5:
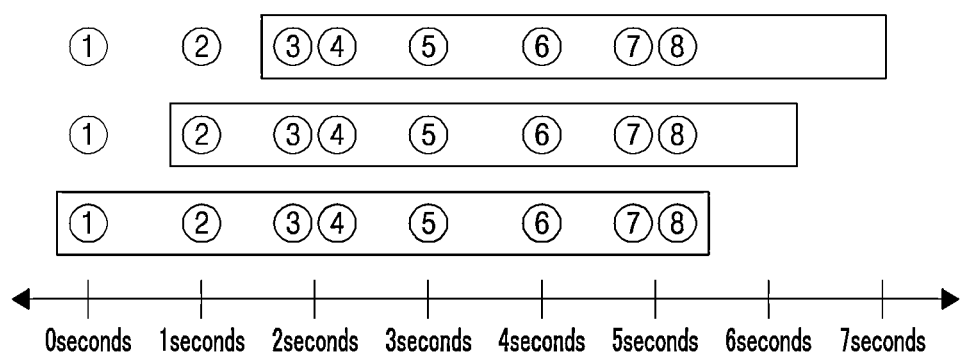
FIG. 5 is a diagram illustrating a process of calculating a core expiration time in a data clustering method according to an embodiment of the present disclosure.

FIG. 5 is a diagram illustrating a process of calculating a core expiration time in a data clustering method according to an embodiment of the present disclosure.

With the passage of time, there may be deviation data that deviates from the sliding window. A data point previously classified as the core may fail to satisfy a core condition when there is deviation data. Accordingly, input data classified as the core specifies deviation data that makes the core not satisfy the core condition. The time when the deviation data deviates from the sliding window is a core expiration time of the input data classified as the core, which may be calculated by summing the input time of the deviation data and a size of the sliding window. That is, the sum of the size of the sliding window and the input time of the deviation data represents a time when the deviation data deviates, and thereby, the core expiration time is determined. The core expiration time may be calculated by the cluster update module 236, and the cluster update module 236 may manage the core expiration time for each data point through a hash map. In this case, the hash map stores information on the core expiration time for each data point. Referring to FIG. 5, it is assumed that input data 6 is classified as a core at the current time (4 seconds). In this case, it is assumed that a size of the sliding window is 5 seconds. Four data points 3, 4, 5, and 6 are within a critical distance from the input data 6 at the time when the input data 6 is classified as the core. Referring to a table of FIG. 4B, at the time point (4 seconds) at which the input data 6 is input, the input data 6 does not satisfy a core condition when the data point 3 deviates from the sliding window. That is, a time point at which the deviation data 3, which makes the input data 6 not satisfy the core condition, deviates from the sliding window. That is, a time point at which the deviation data 3 is input (2 seconds) and the size of the sliding window (5 seconds) are summed up becomes the core expiration time point (7 seconds). As such, in the present disclosure, a core expiration time point of the input data may be calculated at a time point at which the input data is classified as a core.

Referring back to FIG. 2, the cluster update module 236 forms a cluster, including one or more cores and borders, and updates the cluster over time.

Figures 6A, 6B:
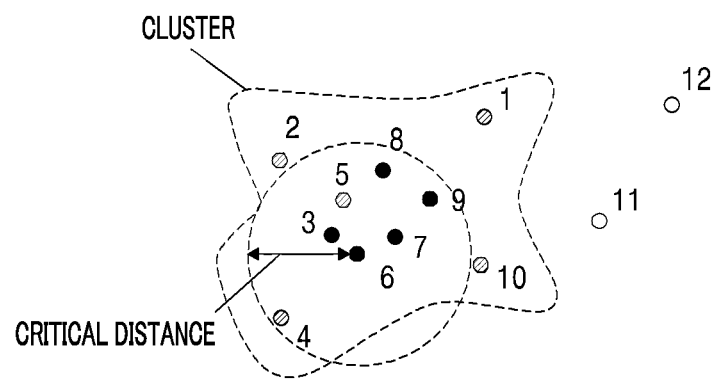
FIGS. 6A, 6B and 7 are diagrams illustrating a cluster update process in a clustering method according to an embodiment of the present disclosure.
Figure 7:
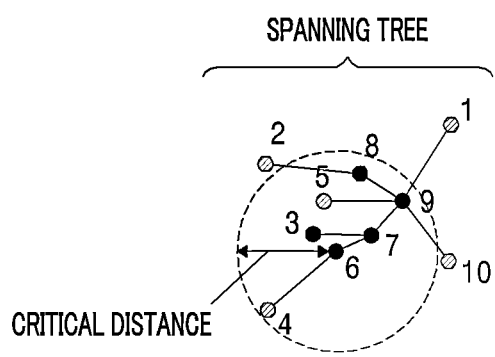

FIGS. 6A, 6B and 7 are diagrams illustrating a cluster update process in a clustering method according to an embodiment of the present disclosure.

As illustrated in FIGS. 6A and 6B, the cluster update module 236 generates or updates a cluster in a form including a core and a border, and noise is excluded from the cluster. In FIG. 6A, black dots 3, 6, 7, 8, and 9 represent cores, pattern dots 1, 2, 4, 5, and 10 represent borders, and white dots 11 and 12 represent noise.

When a distance between any two cores is within a critical distance, the cluster update module 236 updates the cluster according to a first definition in which the two cores are included in the same cluster. In addition, when a core is within a critical distance of a certain border, the cluster update module 236 updates the cluster according to a second definition in which the core and a corresponding border are included in the same cluster. If there is a plurality of cores satisfying the second definition for the border, the cluster is updated in such a way that the corresponding border is included in a cluster including a core with the longest core expiration time point.

As illustrated in FIG. 7, the cluster update module 236 uses a cluster graph-based spanning tree in which cores within a critical distance are connected to each other by an edge for cluster management. In this case, a weight value of the edge of the spanning tree is set to a smaller value among the core expiration times of both cores. In addition, a vertex of the spanning tree is made up of the core, and the border is outside the spanning tree. In addition, when a cycle is generated in the spanning tree, an edge with the smallest weight value among edges constituting the cycle is removed. In addition, several trees that satisfy spanning tree conditions may be generated for the same cluster, and the cluster is managed through one of the trees.

According to a removal process of deviation data, the cluster update module 236 may remove a corresponding data point from the spanning tree and update the cluster. The cluster update module 236 may search for cores that does not satisfy a core condition according to removal of a data point and may remove an edge connected to the corresponding core from the spanning tree. In addition, the cluster update module 236 searches for a core that does not satisfy the core condition according to the removal of the data point and excludes the corresponding core from the spanning tree as the corresponding core is changed to a border, and the data point changed to the border is connected to a core within the critical distance. In these cases, the cluster update module 236 may check cores that do not satisfy the core condition for each time by using information on the core expiration time point of each core stored in a hash map.

FIGS. 8A to 10D are diagrams illustrating a cluster update process according to an embodiment of the present disclosure.

FIGS. 8A, 8B, 8C and 8D illustrate a process of inserting a new core into a cluster.

In each graph, black dots represent cores, white dots represent borders, and gray regions represent spanning trees. In addition, edges represent a connection relationship of respective cores, numbers marked on the edges represent weight values, and numbers in parentheses of each data point represent expiration time points of the cores.

Figure 8A:
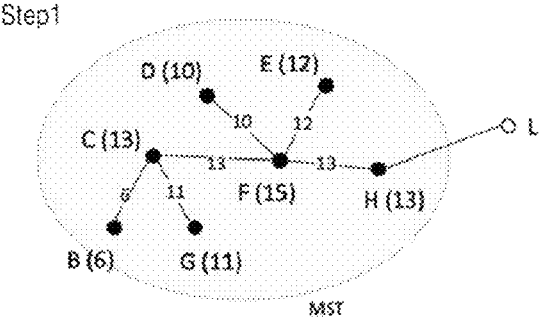
Figure 8B:
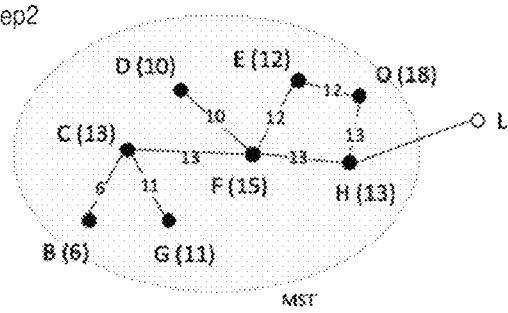

Step 1 of FIG. 8A illustrates a time point immediately before a data point O is input. Then, in step 2 of FIG. 8B, the data point O is classified as a core and a core expiration time point is calculated as 18. The data point O is added to the spanning tree because the data point O is classified as a core, and an edge is formed because both data points E and H are within a critical distance. In this case, weight values of the data points E and O are determined to be a value 12 of the data point E of which core expiration time point is earlier than O's value 18 according to definition of the spanning tree. Similarly, weight values of the data points H and O are determined to be a value 13 of the data point H of which core expiration time point is earlier.

Figure 8C:
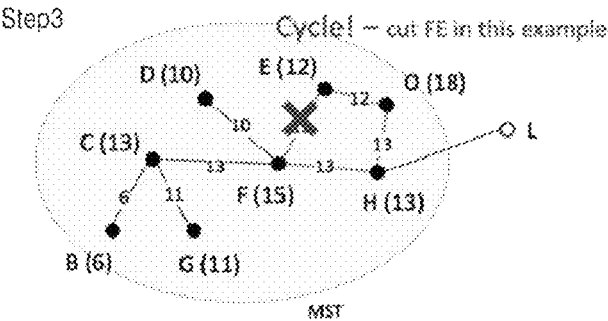

Next, in step 3 of FIG. 8C, a cycle connecting the data points E, F, H, O, and E is generated, and in order to solve this problem, an edge EF or EO with the smallest weight value among the edges constituting the cycle is removed. In the drawings, the edge EF is removed.

Figure 8D:
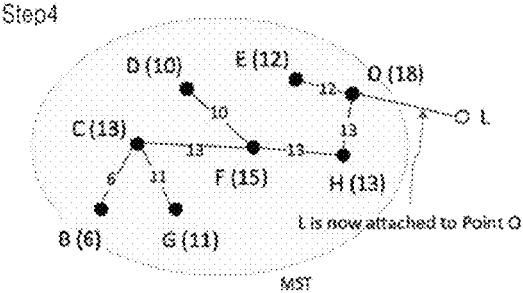

Next, in step 4 of FIG. 8D, connection information of a peripheral border is updated. That is, from viewpoint of a border L, a core O with a later core expiration time point is connected.

Figure 9A:
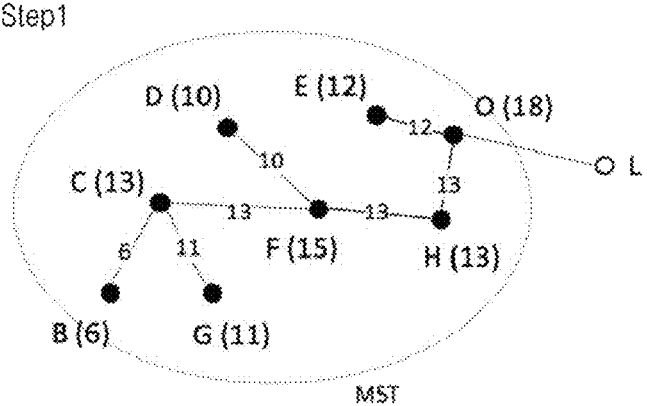
FIGS. 9A and 9B illustrate a process of inserting a border.
Figure 9B:
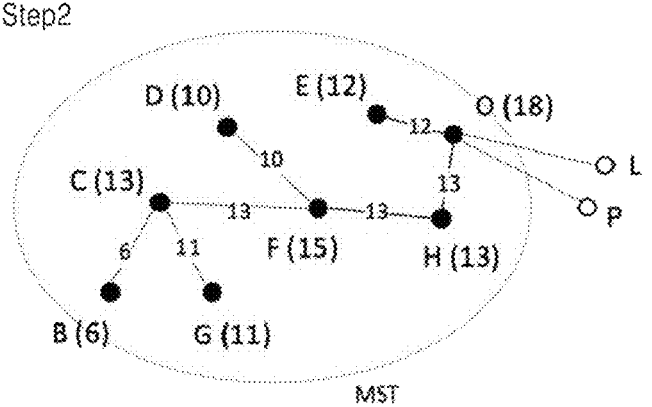

FIGS. 9A and 9B illustrate a process of inserting a border.

Step 1 of FIG. 9A illustrates a time point immediately before a data point P is input. When the data point P is classified as a border, the data point P is connected to a core O of which core expiration time point is the latest among cores within the critical distance as illustrated in step 2 of FIG. 9B.

FIGS. 10A, 10B, 10C and 10D illustrate a process in which a core is removed and a process in which clusters are separated from each other.

Figure 10A:
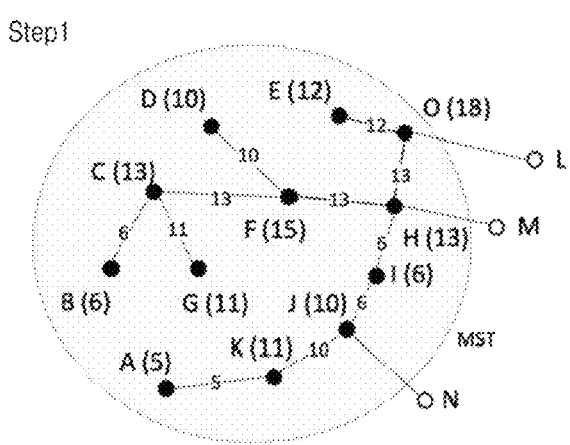

First, in step 1 of FIG. 10A, when the current time point is t=5 as time passes, a core expiration time point of a data point A is reached, and accordingly, the data point A is changed to a border.

Figure 10B:
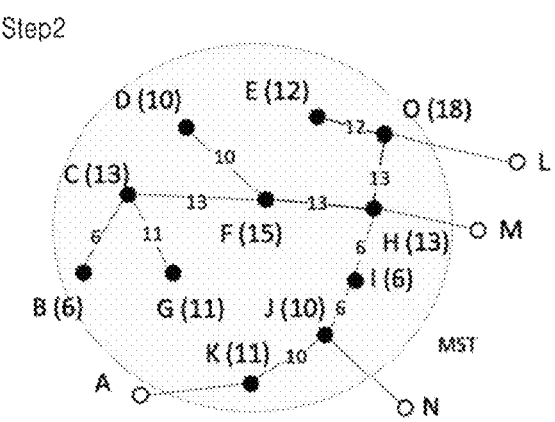

Next, in step 2 of FIG. 10B, the data point A is the border rather than the core, and accordingly, the data point A is removed from the spanning tree. In addition, because the data point A is the border, the data point A is connected to a core K of which core expiration time point is the latest within the critical distance. In this case, the data point A is still the border even when connected to the core, and accordingly, the data point A is excluded from the spanning tree.

Figure 10C:
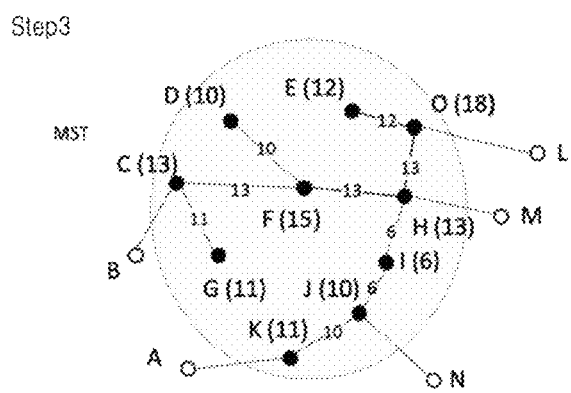
Figure 10D:
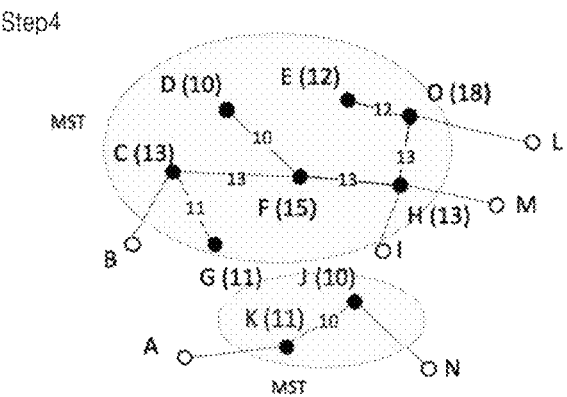

Next, in step 3 of FIG. 10C, when the current time point t=6 as time passes, a data point B and a data point I reach the core expiration time point, and accordingly, the data points B and I are changed to the border as illustrated in step 4 of FIG. 10D.

The data point B is removed from the spanning tree and connected to a core C of which core expiration time point is the latest within the critical distance. In addition, the data point I is removed from the spanning tree and connected to a core H of which core expiration time point is the latest within the critical distance. In addition, the data point I is connected to a total of two cores therebefore, and as the data point I is removed, the spanning tree is divided into two. In this way, when a data point is removed or changed to a border, the spanning tree may be immediately separated, and through this, cluster update, such as removal of data point, may be performed at a very high speed.

In addition, a core that is not connected to another core is changed to noise at the time of expiration.

Figure 11:
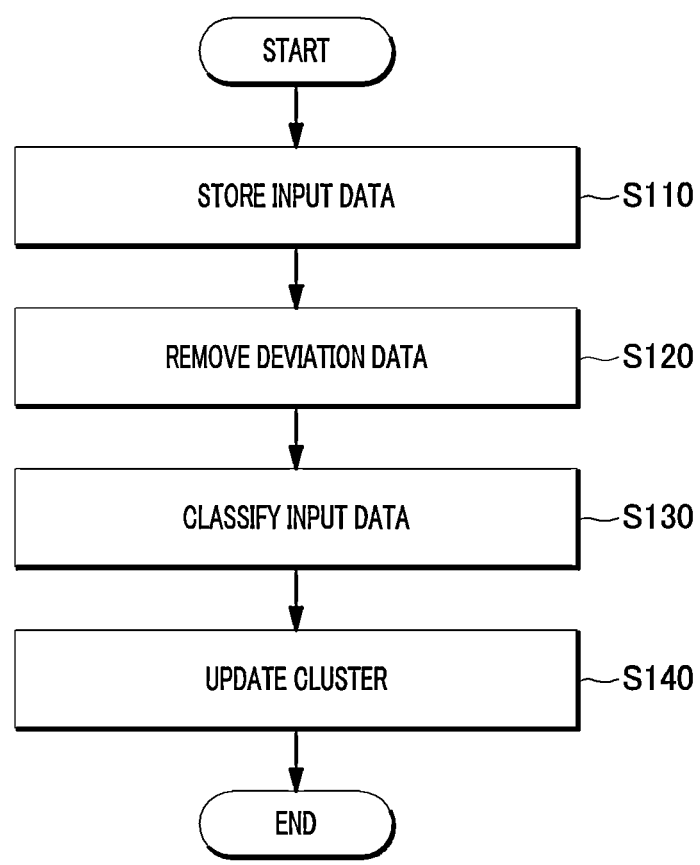
FIG. 11 is a flowchart illustrating a data clustering method according to an embodiment of the present disclosure.

FIG. 11 is a flowchart illustrating a data clustering method according to an embodiment of the present disclosure.

First, the data clustering apparatus 100 stores input data, which is added to a sliding window for processing streaming data, together with spatial information and temporal information (S110). The spatial information and the temporal information of the input data are stored through the data storage module 230. In addition, the index module 232 indexes each data point by using a spatial index, and through this, each data point may be quickly searched by using the spatial information.

Next, the data clustering apparatus 100 removes deviation data that deviates from the sliding window (S120). Through the index module 232, an operation of removing previously stored spatial information of the deviation data may be performed.

Next, the data clustering apparatus 100 classifies the input data into a core, a border, or noise according to density based on the spatial information and the temporal information (S130). That is, when the number of data points spatially located within a critical distance is greater than or equal to a threshold number, the input data is regarded as having a high density and classified as the core. In addition, when the number of data points located within the critical distance is less than the threshold number, the input data is regarded as having a low density and classified as a non-core. When there is another core within the critical distance among non-cores, the input data is classified as the border, and the others are classified as the noise.

Next, a cluster is updated based on a classification result and a removal result (S140).

When a data point is classified as the core, a core expiration time point indicating a time point at which the input data does not satisfy a core condition may be calculated and stored in a hash map. In addition, cores are managed based on a spanning tree and connected to peripheral cores through an edge. In addition, when a cycle is generated by adding a core to the spanning tree, an edge with the smallest weight value among edges constituting the cycle may be removed.

When the data point is classified as the border, the border is connected to a core with the latest core expiration time among cores within the critical distance.

In addition, as the deviation data is removed, the data point is removed from the spanning tree and the cluster is updated. When the deviation data is classified as the core, the corresponding core is directly removed from the spanning tree.

In addition, as the deviation data is removed, a core that does not satisfy the core condition is searched for—the core may be searched for through the hash map described above.

Thereafter, it is possible to remove an edge of the spanning tree which is connected to a core that reaches the core expiration time point. In addition, as the corresponding core is changed to the border, the corresponding core is excluded from the spanning tree and may be connected to another core within a critical distance.

The data clustering method according to the embodiment may be implemented in the form of a recording medium including instructions executable by a computer, such as a program module executed by a computer. A computer readable medium may be accessed by a computer and includes both volatile and a nonvolatile media and removable and non-removable media. Also, the computer readable medium may include a computer storage medium. The computer storage medium includes both volatile and nonvolatile media and removable and non-removable media implemented with a certain method or technology for storing information, such as computer readable instructions, data structures, program modules, or other data.

Although a method and a system of the present disclosure are described in relation to specific embodiments, some or all of components or operations thereof may be implemented by using a computer system having a general-purpose hardware architecture.

The above description of the present disclosure is for illustrative purposes, and those skilled in the art to which the present disclosure belongs may understand that the embodiments may be easily modified into other specific forms without changing the technical idea or essential features of the present disclosure. Therefore, the embodiments described above should be understood as illustrative in all respects and not limiting. For example, each component described as a single type may be implemented in a distribution manner, and similarly, the components described as distributed may be implemented in a combination form.

The scope of the present disclosure is indicated by the following claims rather than the detailed description above, and all changes or modifications derived from the meaning and scope of the claims and equivalent concepts are interpreted to be included in the scope of the present disclosure.

What is claimed is:

1. A density-based data clustering apparatus implemented in hardware comprising:
a memory storing a data clustering program; and
a processor configured to execute the data clustering program stored in the memory, thereby configuring the processor to:
store, by the data clustering apparatus, input data, which is added to a sliding window for processing streaming data, together with spatial information and temporal information;
remove, by the data clustering apparatus, deviation data deviating from the sliding window;
classify, by the data clustering apparatus, the input data into a core, border, or noise according to density based on the spatial information and the temporal information;
update, by the data clustering apparatus, a cluster based on a result of classification of the input data and a result of removal of the deviation data;
form, by the data clustering apparatus, the cluster including one or more cores and borders; and
update, by the data clustering apparatus, the cluster through a spanning tree in which cores within a critical distance are connected to each other by an edge,
wherein, in the updating of the cluster through the spanning tree, a weight value of the edge is set to a smaller value that expires earlier among core expiration time points of both cores, the border is outside the spanning tree, and when a cycle is generated in the spanning tree, an edge with a smallest weight value among edges constituting the cycle is removed,
wherein the data clustering apparatus is configured to remove a data point from the spanning tree and update the cluster as the deviation data is removed,
wherein when the deviation data is classified as the core, the data clustering apparatus is configured to directly remove the corresponding core from the spanning tree,
wherein the data clustering apparatus is configured to search for a core that does not satisfy a core condition as the data point is removed, and to remove an edge connected to the core from the spanning tree or exclude the core from the spanning tree as the core is changed to the border, and to connect the data point that has changed to the border to the core within the critical distance, and
wherein when the data point is removed or changed to the border, the spanning tree is split immediately, allowing cluster updates, such as data point removal, to be performed at an increased speed.

2. The density-based data clustering apparatus of claim 1, wherein, when classifying the input data, the processor is configured to:
classify the input data as the core when data points spatially located within the critical distance among data points input at a same time or earlier as the input data are more than a threshold number,
classify the input data as the border when the data points located within the critical distance are less than the threshold number and there is a core within the critical distance, and
classify the others as the noise.

3. The density-based data clustering apparatus of claim 1, wherein the processor is configured to:
index the spatial information of the input data through a spatial index or remove the spatial information of the deviation data stored in the spatial index.

4. The density-based data clustering apparatus of claim 1, wherein the processor is configured to:
store, in a hash map, the core expiration time point indicating a time point at which the input data classified as the core does not satisfy the core condition.

5. The density-based data clustering apparatus of claim 4, wherein the processor is configured to:
specify deviation data that disqualifies the input data classified as the core from satisfying the core condition as the deviation data deviates from the sliding window, and
calculate a value obtained by summing a time point at which the deviation data is input to the sliding window and a size of the sliding window as the core expiration time point.

6. The density-based data clustering apparatus of claim 1, wherein the data processor is configured to define the cluster according to a first definition that any two cores are included in the same cluster when a distance between the two cores is within the critical distance and a second definition that the core and the border are included in the same cluster when the core is within the critical distance of the border.

7. The density-based data clustering apparatus of claim 6, wherein the processor is configured to connect a core with a later core expiration time point to the border when there is a plurality of cores satisfying the second definition.

8. A process-implemented density-based data clustering method performed by a density-based data clustering apparatus implemented in hardware comprising a memory storing a data clustering program and a processor configured to execute the data clustering program stored in the memory, the density-based data clustering method comprising:
storing, by the data clustering apparatus, input data, which is added to a sliding window for processing streaming data, together with spatial information and temporal information;
removing, by the data clustering apparatus, deviation data deviating from the sliding window;
classifying, by the data clustering apparatus, the input data into a core, border, or noise according to density based on the spatial information and the temporal information; and
updating, by the data clustering apparatus, a cluster based on a result of classification of the input data and a result of removal of the deviation data,
wherein the updating of the cluster comprises forming the cluster including one or more cores and borders, and updating the cluster through a spanning tree in which cores within a critical distance are connected to each other by an edge,
wherein, in the updating of the cluster through the spanning tree, a weight value of the edge is set to a smaller value that expires earlier among core expiration time points of both cores, the border is outside the spanning tree, and when a cycle is generated in the spanning tree, an edge with a smallest weight value among edges constituting the cycle is removed, wherein the updating of the cluster comprises removing a data point from the spanning tree and updating the clustering as the deviation data is removed, wherein when the deviation data is classified as the core, the updating of the cluster comprises directly removing the corresponding core from the spanning tree, wherein the updating of the cluster comprises:

searching for a core that does not satisfy a core condition as the data point is removed;

removing an edge connected to the core from the spanning tree or excluding the core from the spanning tree as the core is changed to the border; and connecting the data point that has changed to the border to the core within the critical distance, and wherein when the data point is removed or changed to the border, the spanning tree is split immediately, allowing cluster updates, such as data point removal, to be performed at an increased speed.

9. The density-based data clustering method of claim 8, wherein the classifying of the input data comprises:

classifying, by the processor, the input data as the core when data points spatially located within the critical distance among data points input at a same time or earlier as the input data are more than a threshold number, classifying, by the processor, the input data as the border when the data points located within the critical distance are less than the threshold number and there is a core within the critical distance, and classifying, by the processor, others as the noise.

10. The density-based data clustering method of claim 8, wherein the storing of the input data comprises indexing the spatial information of the input data through a spatial index; and wherein the removing of the deviation data comprises removing the spatial information of the deviation data stored in the spatial index.

11. The density-based data clustering method of claim 8, wherein the updating of the cluster comprises:

storing, in a hash map, a core expiration time point indicating a time point at which the input data classified as the core does not satisfy the core condition.

12. The density-based data clustering method of claim 11, wherein the updating of the cluster comprises:

specifying deviation data that disqualifies the input data classified as the core from satisfying the core condition as the deviation data deviates from the sliding window, and calculating a value obtained by summing a time point at which the deviation data is input to the sliding window and a size of the sliding window as the core expiration time point.

13. The density-based data clustering method of claim 8, wherein the updating of the cluster comprises:

updating the cluster according to the first definition that any two cores are included in the same cluster when a distance between the two cores is within the critical distance and the second definition that the core and the border are included in the same cluster when the core is within the critical distance of the border.

14. The density-based data clustering method of claim 13, wherein the updating of the cluster comprises:

including the border in a cluster including a core with later core expiration time point when there is a plurality of cores satisfying the second definition.

15. A non-transitory computer-readable recording medium in which a computer program is recorded to perform a density-based data clustering method by a density-based data clustering apparatus implemented in hardware comprising at least one processor configured to execute instructions included in the recording medium, thereby configuring the at least one processor to:

store, by the data clustering apparatus, input data which is added to a sliding window for processing streaming data, together with spatial information and temporal information;

remove, by the data clustering apparatus, deviation data deviating from the sliding window;

classify, by the data clustering apparatus, the input data into a core, border, or noise according to density based on the spatial and temporal information; and update, by the data clustering apparatus, a cluster based on a result of classification of the input data and a result of removal of the deviation data, wherein the updating of the cluster comprises forming the cluster including one or more cores and borders, and updating the cluster through a spanning tree in which cores within a critical distance are connected to each other by an edge, wherein, in the updating of the cluster through the spanning tree, a weight value of the edge is set to a smaller value that expires earlier among core expiration time points of both two cores, the border is outside the spanning tree, and when a cycle is generated in the spanning tree, an edge with a smallest weight value among edges constituting the cycle is removed, wherein the data clustering apparatus is configured to remove a data point from the spanning tree and update the cluster as the deviation data is removed, wherein when the deviation data is classified as the core, the data clustering apparatus is configured to directly remove the corresponding core from the spanning tree, wherein the data clustering apparatus is configured to search for a core that does not satisfy a core condition as the data point is removed, and to remove an edge connected to the core from the spanning tree or exclude the core from the spanning tree as the core is changed to the border, and to connect the data point that has changed to the border to the core within the critical distance, and wherein when the data point is removed or changed to the border, the spanning tree is split immediately, allowing cluster updates, such as data point removal, to be performed at an increased speed.

* * * * *